(12) United States Patent
Falaise et al.

(10) Patent No.: US 9,624,893 B2
(45) Date of Patent: Apr. 18, 2017

(54) ENGINE SHUT-OFF AND RE-START STRATEGY

(71) Applicant: International Truck Intellectual Property Company, LLC, Lisle, IL (US)

(72) Inventors: Nicolas Falaise, Oak Park, IL (US); Dean Alan Opperman, Plainfield, IL (US); Stacey Parker, Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 130 days.

(21) Appl. No.: 14/696,969

(22) Filed: Apr. 27, 2015

(65) Prior Publication Data
US 2016/0312723 A1    Oct. 27, 2016

(51) Int. Cl.
*F02N 11/08* (2006.01)

(52) U.S. Cl.
CPC ...... *F02N 11/0822* (2013.01); *F02N 11/0818* (2013.01); *F02N 11/0833* (2013.01); *F02N 11/0837* (2013.01); *F02N 2200/061* (2013.01); *F02N 2200/0801* (2013.01); *F02N 2200/0802* (2013.01); *F02N 2200/0803* (2013.01); *F02N 2200/0815* (2013.01); *F02N 2200/101* (2013.01); *F02N 2200/102* (2013.01)

(58) Field of Classification Search
CPC ........ F02D 41/04; F02D 41/06; F02D 41/042; F02D 2200/502; F02D 2200/0802; F02D 2200/0803; F02D 2200/0806; F02N 2200/102; F02N 2200/0815; F02N 2200/084; F02N 11/0822; F02N 11/0818; F02N 11/0825; F02N 11/829; F02N 11/0837; F02N 11/0833
See application file for complete search history.

(56) References Cited

U.S. PATENT DOCUMENTS

| | | | |
|---|---|---|---|
| 5,179,920 A | 1/1993 | Bender | |
| 6,275,759 B1 | 8/2001 | Nakajima et al. | |
| 6,308,129 B1 | 10/2001 | Uchida | |
| 6,396,395 B1 | 5/2002 | Zielinski et al. | |
| 6,763,903 B2 * | 7/2004 | Morimoto | B60K 6/485 180/65.26 |
| 6,768,221 B2 | 7/2004 | Klinger et al. | |
| 6,789,519 B1 | 9/2004 | Bell | |
| 6,836,718 B2 | 12/2004 | Hasfjord et al. | |
| 6,885,113 B2 | 4/2005 | Lim | |
| 7,091,629 B2 * | 8/2006 | Hawkins | F02N 11/0803 123/179.4 |
| 7,158,014 B2 | 1/2007 | Lahr et al. | |
| 7,236,090 B2 | 6/2007 | Gumbel et al. | |
| 7,354,379 B2 | 4/2008 | Moriya | |
| 7,378,946 B2 | 5/2008 | Lahr et al. | |
| 8,402,936 B2 | 3/2013 | Nakamura | |

(Continued)

FOREIGN PATENT DOCUMENTS

JP    WO 2015097755 A1 *  7/2015  ............. F02D 17/00

*Primary Examiner* — Hai Huynh
*Assistant Examiner* — George Jin
(74) *Attorney, Agent, or Firm* — Jeffrey P. Calfa; Mark C. Bach

(57) ABSTRACT

When a non-hybrid motor vehicle is stopped, its engine is shut-off upon concurrence of certain conditions precedent without turning off the ignition switch.

16 Claims, 4 Drawing Sheets

(56) References Cited

U.S. PATENT DOCUMENTS

| | | | |
|---|---|---|---|
| 8,463,527 B2 | 6/2013 | Thorsen et al. | |
| 8,511,270 B2 | 8/2013 | Hamane | |
| 2007/0054773 A1* | 3/2007 | Braun | B60T 7/12 |
| | | | 477/4 |
| 2007/0245997 A1* | 10/2007 | Levasseur | F02N 11/0822 |
| | | | 123/179.4 |
| 2007/0256657 A1* | 11/2007 | Celisse | F02N 11/006 |
| | | | 123/179.3 |
| 2008/0109149 A1* | 5/2008 | Magarida | F02D 13/08 |
| | | | 701/112 |
| 2008/0201064 A1* | 8/2008 | DiGonis | F02N 11/0822 |
| | | | 701/110 |
| 2009/0319161 A1* | 12/2009 | Abendroth | F02N 11/0818 |
| | | | 701/112 |
| 2010/0186711 A1* | 7/2010 | Speers | F02M 3/00 |
| | | | 123/339.14 |
| 2012/0035817 A1 | 2/2012 | Waku et al. | |
| 2014/0229090 A1* | 8/2014 | Rademacher | F02D 35/00 |
| | | | 701/112 |
| 2014/0297165 A1* | 10/2014 | Matsunaga | B60W 10/06 |
| | | | 701/112 |

* cited by examiner

ENGINE SHUT-OFF AND RE-START STRATEGY

TECHNICAL FIELD

The disclosed subject matter relates to a strategy for stopping and re-starting an internal combustion propulsion engine, such as a diesel engine for example, of a non-hybrid motor vehicle.

BACKGROUND

A hybrid vehicle, which is selectively propelled either by an internal combustion engine or by an electric motor-generator when operating as a motor, typically shuts off the engine, if running, when the vehicle stops, thereby conserving fuel and reducing tailpipe emissions. Such a hybrid vehicle however requires a more complicated transmission than a non-hybrid motor vehicle which is propelled solely by an internal combustion engine because the transmission must shift without driver intervention to disconnect the engine from the drivetrain when the vehicle comes to a complete stop. An internal combustion engine which propels a non-hybrid motor vehicle is typically shut off by a switch which is operated as a result of an action by a driver of the vehicle independently of whether or not the transmission is in a drive gear. An ignition switch is commonly used both to start and to stop the engine of a non-hybrid motor vehicle. One type of ignition switch is a key-operated switch which is turned in one direction to crank the engine at starting and turned in an opposite direction to shut off the engine.

SUMMARY

The present disclosure introduces a strategy for shutting off an internal combustion engine of a non-hybrid motor vehicle when the motor vehicle has been brought to a complete stop by a driver of the vehicle. The strategy shuts off, i.e. stops, the engine in response to the concurrence of certain conditions precedent some of which are initiated by actions of a driver of the motor vehicle once the motor vehicle has stopped. The strategy can be implemented in new vehicles and vehicles already in service without those vehicles having a transmission which disconnects the engine from the drivetrain without driver intervention when the vehicle has come to a complete stop.

While the strategy is useful in non-hybrid vehicles which are propelled solely by internal combustion engines, it is especially useful in such vehicles which make frequent stops for pickup and/or delivery along a route of travel, one example being a school bus vehicle.

Conditions precedent for engine shut-off include a vehicle's speed being zero, an accelerator pedal not being depressed, a transmission being in a non-drive gear, a park brake locking at least some of the wheels of the motor vehicle against rotation, and a service brake pedal not being depressed. Engine shut-off may occur when those five basic conditions alone are satisfied. Engine shut-off may also be conditioned on conditions precedent which are additional to the five basic ones just mentioned. Failure to satisfy any additional condition will override satisfaction of the five basic conditions and thereby prevent engine shut-off.

One general aspect of the disclosed subject matter relates to a motor vehicle having an internal combustion engine which is operable via an accelerator pedal to propel the motor vehicle via wheels on which the motor vehicle travels, at least some of which are drive wheels which are connected through a transmission to the internal combustion engine.

The motor vehicle also has service brakes which are operable via depression of a service brake pedal to cause brake torque to be applied to at least some of the wheels when rotating.

The motor vehicle also has a park brake which is operable to lock at least some of the wheels against rotation when speed of the motor vehicle is zero.

The motor vehicle also has an ignition switch which is operable from an OFF position, to crank the engine at initial starting, and which once the engine has started, remains in an ON position to allow the engine to be accelerated by depression of the accelerator pedal and to propel the motor vehicle if the transmission is in a forward or reverse drive gear.

A controller is operable while the ignition switch remains in ON position to cause the engine to shut off in response to concurrence of certain conditions precedent including the speed of the motor vehicle being zero, the accelerator pedal being not depressed, the transmission being in a non-drive gear, the park brake locking at least some of the wheels against rotation, and the service brake pedal being not depressed.

An additional aspect relates to an engine re-start strategy in which the controller causes engine re-start by depression of the service brake pedal brake while the ignition switch remains in ON position. The strategy may also cause engine re-start while the ignition switch remains in ON position without depression of the service brake pedal if engine temperature drops below normal operating temperature range. Engine re-start may be conditioned on a door closing a doorway which provides ingress to and egress from an interior of the motor vehicle.

The foregoing summary is accompanied by further detail of the disclosure presented in the Detailed Description below with reference to the following drawings which are part of the disclosure.

DETAILED DESCRIPTION

Figure 1:
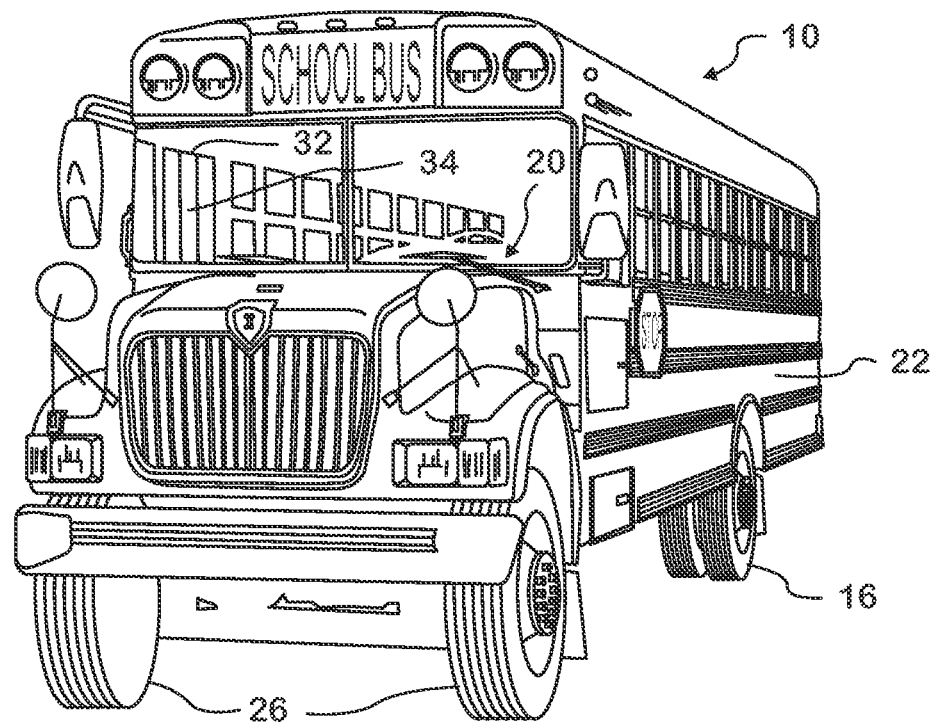
FIG. 1 is a perspective view of a school bus vehicle as viewed from the left front of the school bus vehicle.
Figure 2:
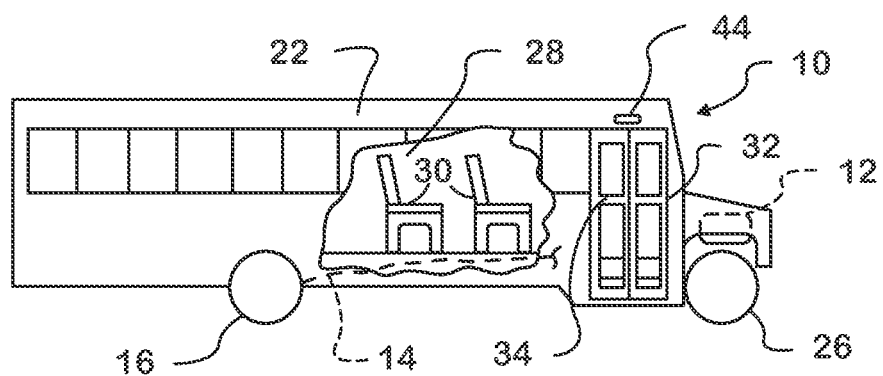
FIG. 2 is a right side view of the school bus vehicle with a portion broken away to show some of the interior.
Figure 3:
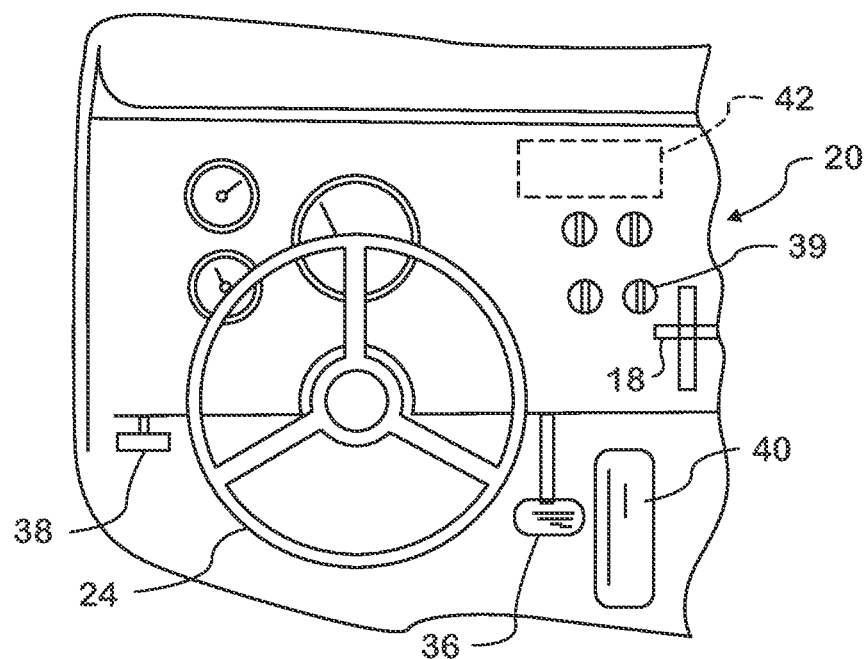
FIG. 3 is a plan view of a portion of a driver's compartment.

FIGS. 1-3 show a non-hybrid school bus vehicle 10 having an internal combustion engine 12 and wheels on which the bus vehicle travels. Engine 12 operates through a drivetrain 14 to rear drive wheels 16 which propel the bus vehicle on roadways. Drivetrain 14 includes a transmission which can be shifted to various drive and non-drive gears by a driver of bus vehicle 10 operating a shift control 18 at a driver's station 20 within an interior of a body 22 of bus vehicle 10. Bus vehicle 10 is steered by a steering system which comprises a steering wheel 24 at driver's station 20 for steering front steered wheels 26.

Body 22 further comprises passenger space 28, including seats 30 for passengers, and a doorway 32 through which passengers can obtain ingress to and egress from the interior of body 22. A door 34 is operable to selectively open and close doorway 32. With door 34 open, a lamp 44 illuminates the entrance/exit path.

At the wheels on which bus vehicle 10 travels, there are service brakes which are operable via a service brake pedal 36 at driver's station 20 being operated from a non-depressed position to a depressed position to cause brake torque to be applied to at least some of the wheels when bus vehicle 10 is traveling.

A park brake is operable by a handle 38 at driver's station 20 to lock at least some of the wheels against rotation while the bus vehicle is stopped.

Engine 12 is started by the driver operating an ignition switch 39. A key-operated switch is one example of an ignition switch. Turning ignition switch 39 from an OFF position to a CRANK position causes engine 12 to be cranked. Once engine 12 has started, ignition switch 39 is placed in, and remains in, an ON position. Engine 12 can then be accelerated by the driver operating an accelerator pedal 40 from a non-depressed position to a depressed position. If the transmission is in a non-drive gear, engine 12 will accelerate without accelerating bus vehicle 10. If the transmission is in a drive gear, engine 12 will accelerate bus vehicle 10.

The electrical system of bus vehicle 10 has a controller 42 which may comprise one or more individual electronic control units (ECU's).

With bus vehicle 10 stopped, controller 42 is operable to cause engine 12 to shut off while ignition switch 39 remains in ON position, in response to the driver having released accelerator pedal 40, having shifted the transmission via shift control 18 to disconnect rear drive wheels 16 from engine 12, having operated the park brake via handle 38 to lock the wheels against rotation, and having released service brake pedal 36 so that it ceases to be depressed. Inputs, such as switch inputs, are associated the accelerator pedal, transmission, park brake, and service brake pedal to signal each of those four conditions precedent for engine shut-off to controller 42. With bus vehicle 10 stopped and engine 12 shut off, door 34 is opened to allow passengers to enter and exit and then closed.

With door 34 closed, detection of depression of service brake pedal 36 by controller 42 causes engine 12 to be cranked while ignition switch 39 remains in ON position. A switch may be associated with door 34 to prevent engine re-start as long as door 34 is not closed.

Figure 4A:
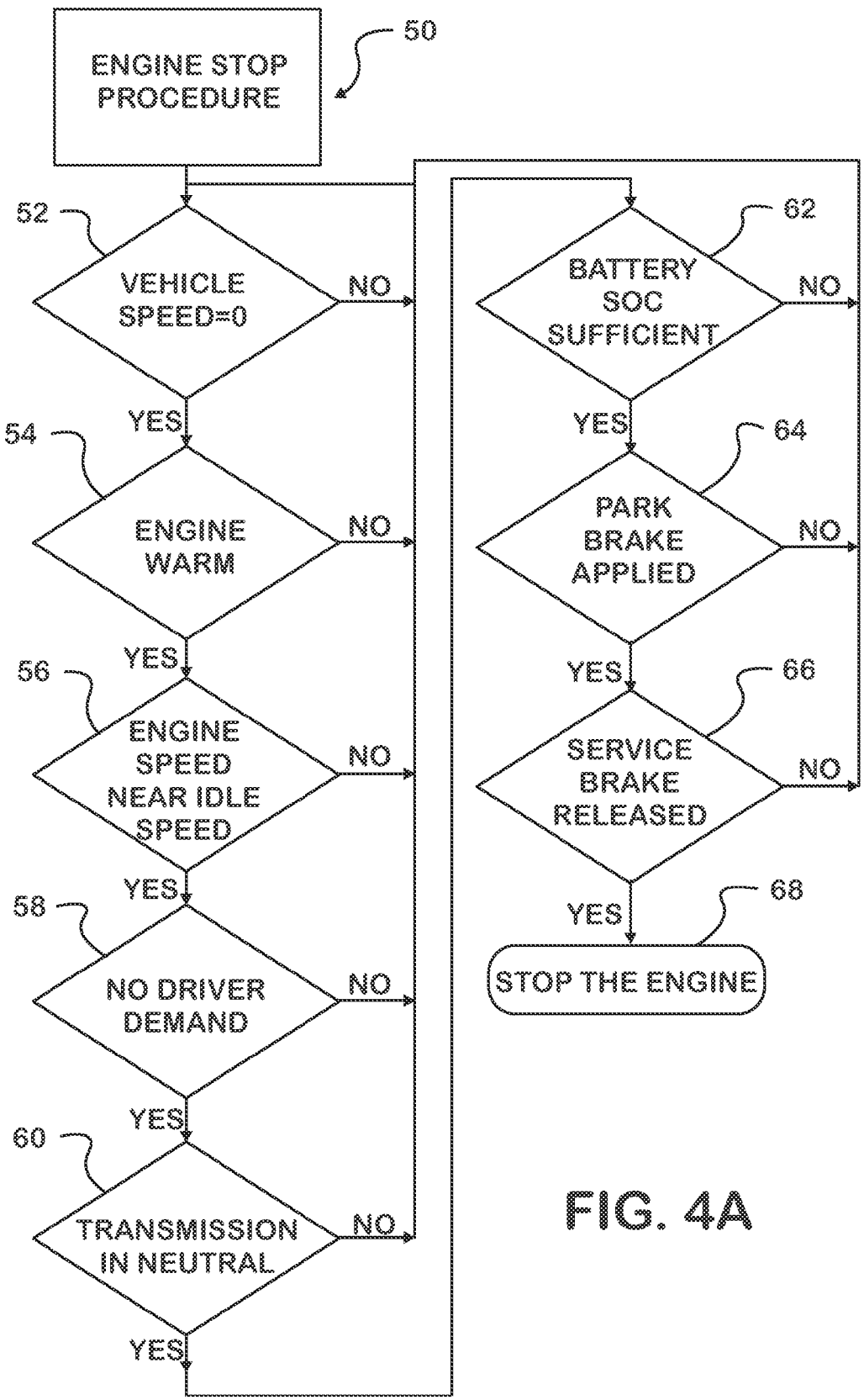
FIG. 4A is an engine stop strategy diagram.

FIG. 4A illustrates an example of an algorithm for an engine stop strategy 50 for shutting off engine 12 after bus vehicle 10 has come to a complete stop. The algorithm is repeatedly iterated by a processor in controller 42 to disclose when each of certain specific conditions precedent to shutting off the engine has been satisfied. The sequence of the algorithm's steps shown in FIG. 4 should not be construed to imply any particular order in which those specific conditions precedent must be satisfied although a typical order of performance which would shut off engine 12 would be: speed of bus vehicle 10 must be zero ("vehicle speed=0" condition 52); release of the accelerator pedal ("no driver demand" condition 58), i.e. accelerator being in non-depressed position; the transmission being in a non-drive gear ("transmission in neutral" condition 60); the park brake being applied ("park brake applied" condition 64); and the service brake pedal being released ("service brake released" condition 66), i.e. service brake pedal being in non-depressed position.

In addition to those five basic conditions precedent, strategy 50 includes additional conditions precedent: engine 12 must be warm, meaning within normal operating temperature range ("engine warm" condition 54); engine 12 must be running at or near engine idle speed ("engine speed near idle speed" condition 56), i.e. engine speed at an engine idle speed defined by controller 42; and the cranking battery must show a state of charge (SOC) as least as great as a predetermined threshold sufficient to crank the engine at engine re-start ("battery SOC sufficient" condition 62). According to the algorithm only after those additional conditions too have been satisfied is engine 12 shut off (step 68), although it is to be understood that those additional conditions, while preferably employed, may be optional. Failure to satisfy any one of those additional conditions which is employed in a particular strategy makes such additional condition or conditions effective to override satisfaction of the five basic conditions precedent 52, 58, 60, 64, 66.

It is to be noticed that in the sequence of steps illustrated in FIG. 4A, battery SOC is monitored at step 62 which occurs prior to steps 64 and 66. If battery SOC is below the predetermined threshold, procedure 50 will prevent engine 12 from being shut off even if the conditions monitored by steps 52, 58, 60, 64, and 66 are satisfied because steps 64 and 66 are never reached during an iteration of the algorithm. That allows an alternator which is operated by the running engine to continue to deliver charging current to the battery.

Figure 4B:
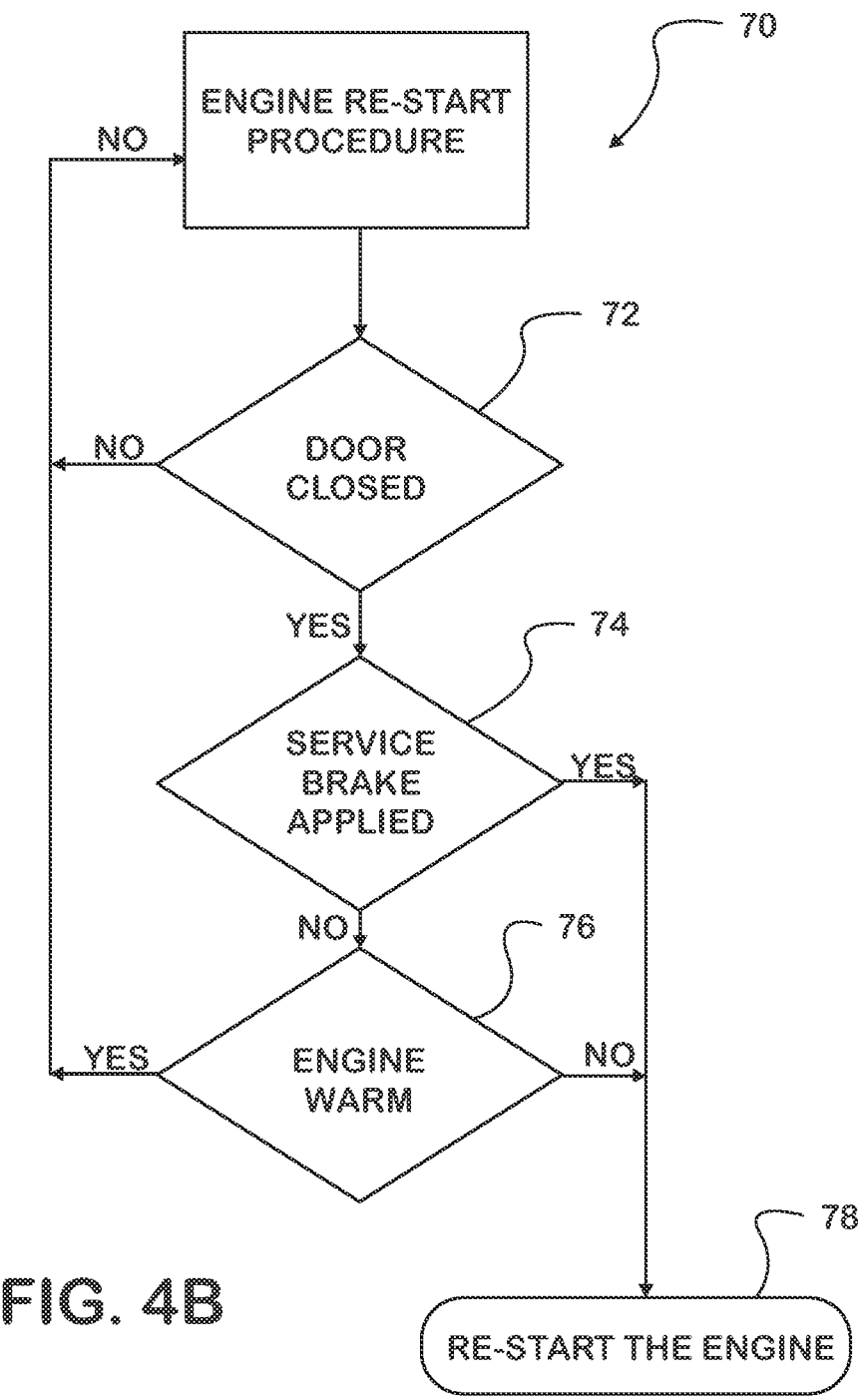
FIG. 4B is an engine re-start strategy diagram.

After engine 12 has been shut off, an algorithm for an Engine Re-Start Procedure 70 shown in FIG. 4B iterates. If engine re-start is conditioned on door 34 being closed, a step 72 is performed. As long as step 72 detects that door 34 is not closed, procedure 70 doesn't allow engine 12 to be re-started.

Once closure of door 34 has been detected by a step 72, a step 74 detects whether service brake pedal 36 is depressed. If service brake pedal 36 remains not depressed, a step 76 detects whether engine temperature has fallen below a normal engine operating temperature range. If engine temperature is below a threshold which defines the lower limit of the normal operating temperature range, procedure 70 causes engine re-start (step 78), but if not, the algorithm iterates and will continue to do so until either service brake pedal 36 is depressed or engine temperature drops below the lower limit.

Once engine 12 has been re-started by procedure 70, bus vehicle 10 can then resume travel along its route after the park brake has been released.

As applied to any non-hybrid vehicle propelled by an internal combustion engine, the disclosed algorithms promote fuel economy and reduction of tailpipe emissions. They can be implemented in existing controllers without major mechanical modifications in certain vehicles.

What is claimed is:

1. A motor vehicle comprising:
an internal combustion engine operable via an accelerator pedal which when operated from a non-depressed position to a depressed position propels the motor vehicle via wheels on which the motor vehicle travels, at least some of which are drive wheels which are connected through a transmission to the internal combustion engine;
service brakes operable via a service brake pedal when operated from a non-depressed position to a depressed position to cause brake torque to be applied to at least some of the wheels when rotating;
a park brake operable to lock at least some of the wheels against rotation while the speed of the motor vehicle is zero;

a controller which causes the engine to shut off in response to concurrence of certain conditions precedent comprising speed of the motor vehicle being zero, the accelerator pedal being in non-depressed position, the transmission being in a non-drive gear, the park brake locking at least some of the wheels against rotation, and the service brake pedal being in non-depressed position, in which with the engine shut off, the controller causes the engine to re-start when the service brake pedal is operated to depressed position.

2. A motor vehicle as set forth in claim 1 in which the controller conditions engine shut-off on at least one additional condition precedent.

3. A motor vehicle as set forth in claim 2 in which the at least one additional condition precedent comprises engine speed being at an engine idle speed defined by the controller.

4. A motor vehicle as set forth in claim 2 in which the at least one additional condition precedent comprises state of charge of a battery for cranking the engine being at least as great as a predetermined threshold.

5. A motor vehicle as set forth in claim 1 further comprising an ignition switch which is left in an ON position while the engine is stopped and re-started by the controller.

6. A motor vehicle as set forth in claim 1 in which the controller conditions engine re-start on a door closing a doorway which provides ingress to and egress from an interior of the motor vehicle.

7. A motor vehicle as set forth in claim 1 in which with the engine having been shut off by the controller in response to concurrence of certain conditions precedent, the controller causes the engine to re-start when engine operating temperature drops below a lower limit of a normal engine operating temperature range while the service brake pedal remains in non-depressed position.

8. A motor vehicle as set forth in claim 7 further comprising an ignition switch which is left in an ON position while the engine is stopped and re-started by the controller.

9. A method of stopping running of an internal combustion engine which propels a motor vehicle having an accelerator pedal which when operated from a non-depressed position to a depressed position propels the motor vehicle via wheels on which the motor vehicle travels, at least some of which are drive wheels which are connected through a transmission to the internal combustion engine, service brakes which when operated via depression of a service brake pedal from a non-depressed position to a depressed position cause brake torque to be applied to at least some of the wheels when rotating, a park brake operable to lock at least some of the wheels against rotation when speed of the motor vehicle is zero, the method comprising:

with the engine running, shutting off the engine via a controller in response to concurrence of certain conditions precedent comprising speed of the motor vehicle being zero, the accelerator pedal being in non-depressed position, the transmission being in a non-drive gear, the park brake locking at least some of the wheels against rotation, and the service brake pedal being in non-depressed position including causing the controller to re-start the engine by operating the service brake pedal from non-depressed position to depressed position.

10. A method as set forth in claim 9 including conditioning engine shut-off on at least one additional condition precedent.

11. A method as set forth in claim 9 including conditioning engine shut-off on engine speed being within a defined engine idle speed range.

12. A method as set forth in claim 9 including conditioning engine shut-off on state of charge of a battery for cranking the engine being at least as great as a predetermined threshold.

13. A method as set forth in claim 9 including conditioning engine re-start on a door closing a doorway which provides ingress to and egress from an interior of the motor vehicle.

14. A method as set forth in claim 9 including causing engine re-start via the controller when engine operating temperature drops below a lower limit of a normal engine operating temperature range while the service brake pedal remains in non-depressed position.

15. A method as set forth in claim 9 comprising operating the service brake pedal from non-depressed position to depressed position after the accelerator pedal has been operated from depressed position to non-depressed position, after vehicle speed is zero, after the transmission has been placed in a non-drive gear, and after the park brake has locked at least some of the wheels against rotation.

16. A method as set forth in claim 9 further comprising, while the engine is shut off and re-started by the controller, leaving an ignition switch in an ON position.

* * * * *